United States Patent [19]

Urlings

[11] Patent Number: 5,080,793
[45] Date of Patent: Jan. 14, 1992

[54] APPARATUS AND METHOD FOR THE SIMULTANEOUS PURIFICATION OF AIR AND WATER

[75] Inventor: Leonardus G. C. M. Urlings, Hoevelaken, Netherlands

[73] Assignee: Tauw Infra Consult B.V., Deventer, Netherlands

[21] Appl. No.: 588,926

[22] Filed: Sep. 27, 1990

[30] Foreign Application Priority Data

Feb. 14, 1990 [NL] Netherlands ............... 9000354

[51] Int. Cl.$^5$ .................................. C02F 3/06
[52] U.S. Cl. .................................. 210/603; 210/615; 210/617; 210/150; 210/201; 210/221.2; 210/255; 210/916; 55/85; 55/98; 55/482; 435/266
[58] Field of Search ............. 210/150, 151, 196, 221.2, 210/201, 255, 259, 295, 603, 615, 616, 617, 622, 631, 916; 55/85, 89, 98, 99, 390, 482; 435/262, 266

[56] References Cited

U.S. PATENT DOCUMENTS

| | | | |
|---|---|---|---|
| 2,200,581 | 5/1940 | Prüss et al. | 435/266 |
| 2,237,882 | 4/1941 | Lawlor et al. | 210/150 |
| 2,580,764 | 1/1952 | Gunz | 210/151 |
| 3,837,494 | 9/1974 | Stevenson | 210/259 |
| 4,009,099 | 2/1977 | Jeris | 210/151 |
| 4,415,454 | 11/1983 | Fuchs | 210/616 |
| 4,498,985 | 2/1985 | Atkinson et al. | 210/151 |
| 4,544,381 | 10/1985 | Schmidt | 55/89 |
| 4,576,718 | 3/1986 | Reischl et al. | 210/616 |
| 4,613,433 | 9/1986 | McKeown | 210/150 |
| 4,627,917 | 12/1986 | Morper | 210/150 |
| 4,662,900 | 5/1987 | Ottengraf | 55/94 |
| 4,723,968 | 2/1988 | Schippert et al. | 55/94 |
| 4,826,601 | 5/1989 | Spratt et al. | 210/617 |
| 4,894,162 | 1/1990 | Cournoyer et al. | 210/603 |
| 4,925,552 | 5/1990 | Bateson et al. | 210/617 |
| 4,959,084 | 9/1990 | Wolverton et al. | 435/266 |

FOREIGN PATENT DOCUMENTS

| | | |
|---|---|---|
| 233824 | 3/1986 | German Democratic Rep. |
| 58-27620 | 2/1983 | Japan. |
| 62-74491 | 4/1987 | Japan. |

*Primary Examiner*—Ivars Cintins
*Assistant Examiner*—Christopher Upton
*Attorney, Agent, or Firm*—Young & Thompson

[57] ABSTRACT

Apparatus and method for the simultaneous purification of air and water, using a plurality of compartments arranged in a series extending from a first to a last compartment. Each compartment is partially filled with a biologically active material. Air and water to be purified are introduced into the first compartment into a lower portion thereof. Each said compartment other than the last compartment has outlets for air and water adjacent an upper portion thereof communicating with conduits for conveying air and water to a lower portion of the next compartment in the series. Each compartment other than the last has a closed top such that air can leave only through the conduits and pass to a lower portion of the next compartment. The last compartment has outlets adjacent an upper portion thereof for purified air and water.

7 Claims, 8 Drawing Sheets

APPARATUS AND METHOD FOR THE SIMULTANEOUS PURIFICATION OF AIR AND WATER

The invention relates to an apparatus for carrying out (ground-)water purification comprising one or more compartments placed above or next to one another, provided with inlets and outlets and partially filled with a biologically active material, and also to a method for purifying air and water.

Such an apparatus, in which a combined air and water purification is used, is described in the non-prior-published Dutch Patent Application 89.00494.

In this method, the air to be purified and the water to be purified, optionally supplemented with additional air, are passed simultaneously through an aerobiological system which contains microorganisms which are able to use the organic compounds, present as contamination, as energy and/or sources of carbon.

It is expedient to use an apparatus which comprises one or more compartments and in which an inlet for the water to be treated and the air to be treated is provided at the bottom of the first compartment.

Said apparatus may be provided with a device for supplying additional air at the bottom. This makes it possible to maintain a favourable ratio between oxygen and organic contaminants and to maintain a favourable ratio between air and water for good mixing/flow through the system.

The apparatus is provided with an overflow at the top, through which overflow the water is passed to a subsequent compartment in which it is again fed to a point such that it flows upwards through the compartment and in which compartment an air outlet pipe with which the air is fed to the bottom of the subsequent compartment is provided. A good flow is achieved with such a construction. Water and air can be fed separately via two separate pipe systems or jointly through one pipe system to the subsequent compartment.

It is a requirement for good operation that the section with upward flow contains carrier material to which the microorganisms which have to carry out the conversion are able to attach themselves.

By providing a grid at the top of the compartments, it is possible to prevent the carrier material being entrained with the water flowing through. As a result of this, a good separation is therefore obtained between the water flowing through and air on the one hand, and the carrier material on the other.

This patent application describe a method for purifying air and/or water in which the apparatus according to the invention is used.

According to an embodiment of said method, nutrients such as nitrogen, phosphates and trace elements are added as required.

In this method, water and air are purified in a reactor chamber. The contaminants may be volatile, semi-volatile as well as non-volatile compounds which may be present both in the air to be treated and in the water to be treated. Passing the air to be purified and the water to be purified simultaneously through an aerobic biological system which contains microorganisms which are able to utilise said organic compounds as a source of energy and/or carbon makes it possible for the contamination to be removed from the aqueous and air phase in one reactor. An installation in accordance with this system may comprise several compartments which are arranged in series behind or above one another. In the first compartment, the water to be treated and the air to be treated are fed in at the bottom. In addition, if required, additional air can be fed in at this point in order to introduce sufficient oxygen into the system for aerobic decomposition of the contaminants and also to create a favourable air/water ratio. The water flow through the system is shown in FIG. 1.

This apparatus comprises five compartments. It will be clear that another number of compartments can also be used. The water inlet and air inlet are installed at the bottom of the first compartment ((1) and (2) respectively). The water is passed via an overflow (3) to the subsequent compartment in which the debouchment is again provided at the bottom. Said compartment is also provided with an additional air inlet (4) at the bottom. The overflow may comprise a tube, but in the case of higher flow rates, the overflow may be provided over the entire wall of the compartment. The final compartment is provided with an outlet for treated water (5) and an air outlet (6).

Figure 1:
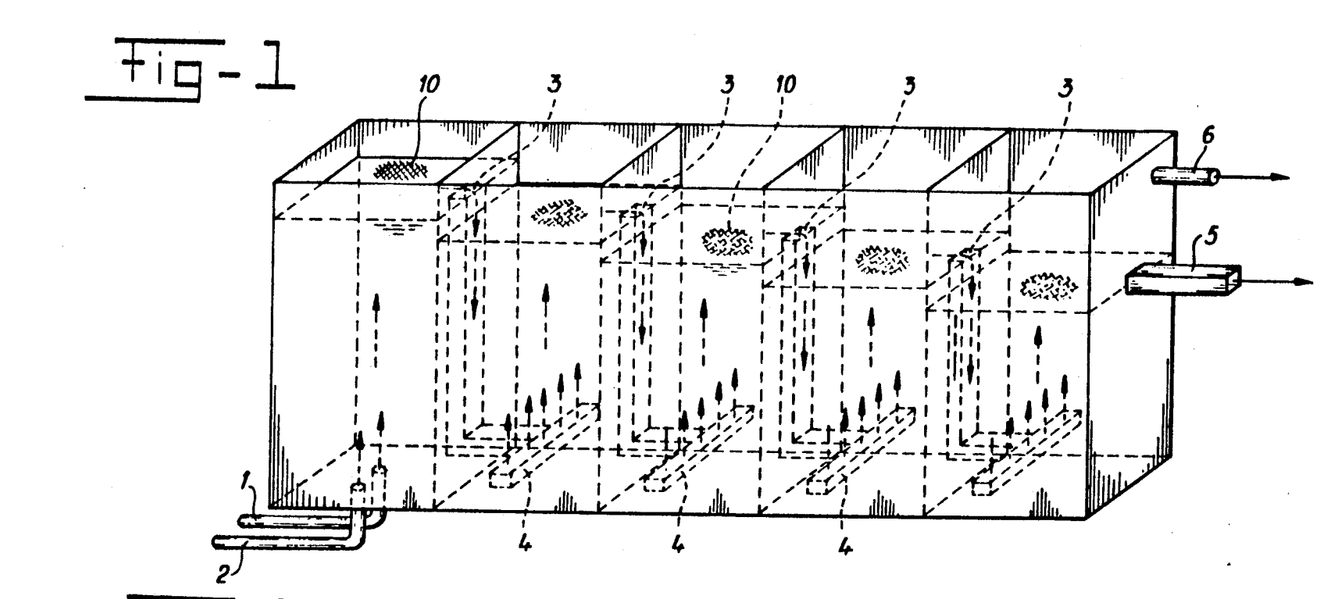
Figure 2:
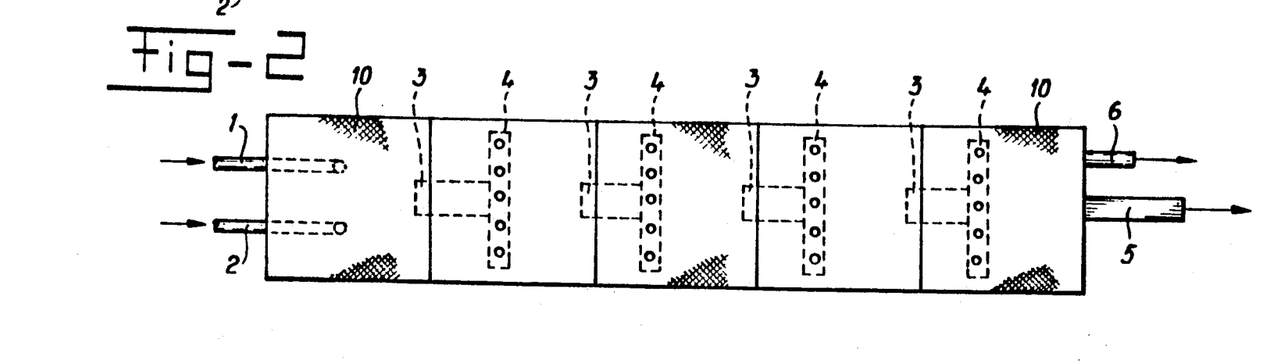

FIG. 2 shows a plan view of the inlet pipes with distribution nozzles as shown in FIG. 1.

Figure 3:
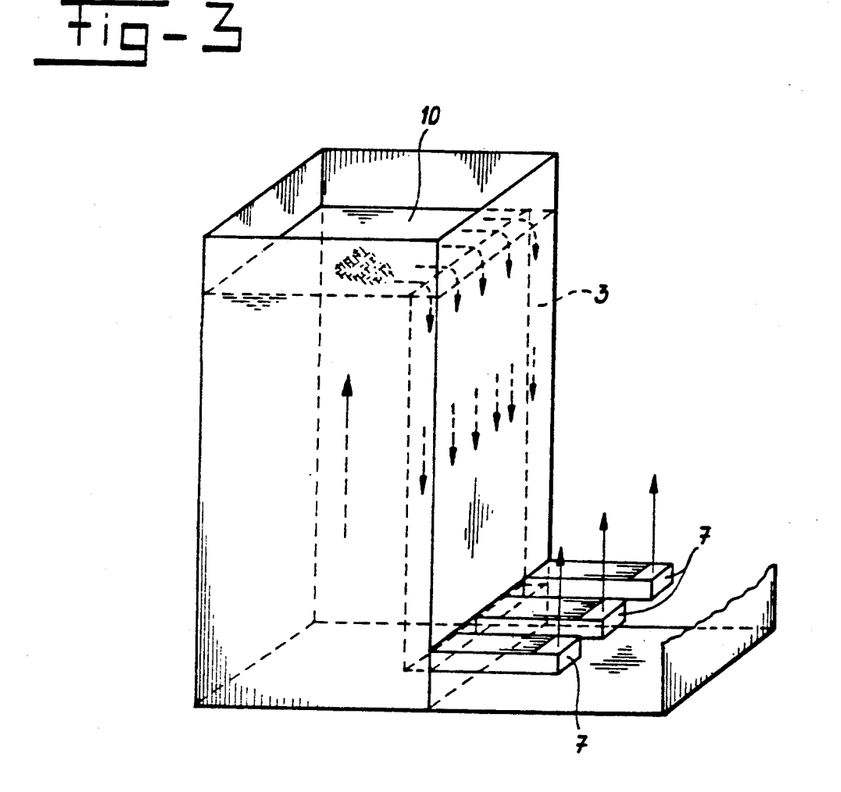

FIG. 3 shows an embodiment in which the overflow is provided over the entire wall of the compartment, while the debouchment and inlet of air and water takes place in the subsequent compartment via a number of inlets (7).

Figure 4:
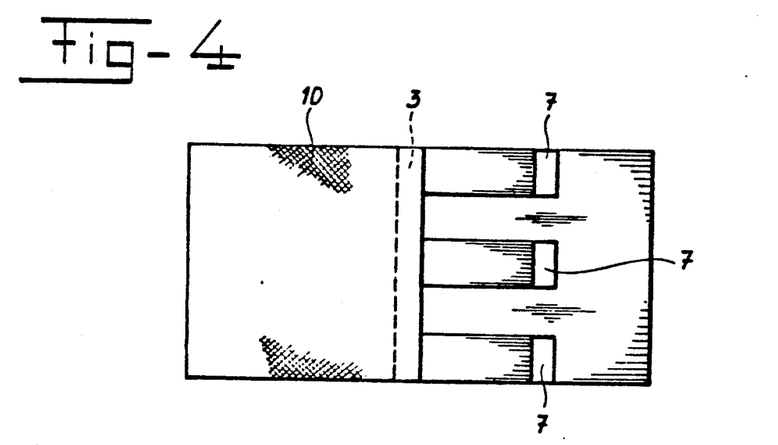

FIG. 4 is in this case again a plan view.

Figure 5:
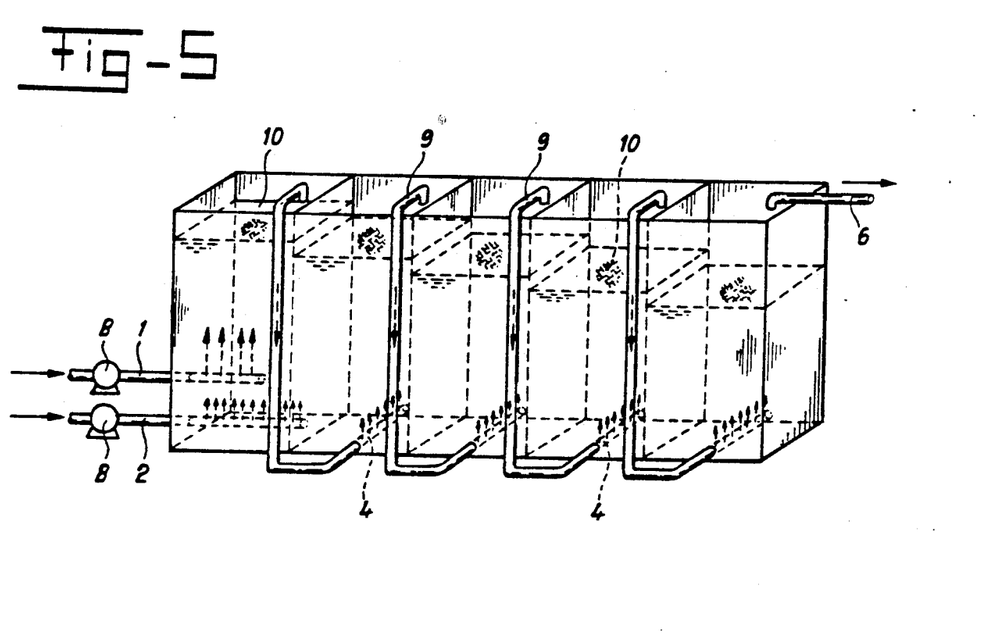

FIG. 5 illustrates the route of the air flow. The air flow runs via pump (8), which provides the necessary pressure, and pipes (4 and 9), it being possible to feed in any additional air required, which is necessary to introduce sufficient oxygen and to achieve the correct air/water ratio.

The air/water ratio must be at least 1 and not more than 40. At the top of the first compartment, the air is collected and transferred by means of a pipe (9) to the bottom of the subsequent compartment. In this way, the air flow passes through all the compartments. The water is fed in via pipe (1) which, if desired, can be provided with a pump (12). (If desired, each compartment may be provided with pumps.)

Figure 6:
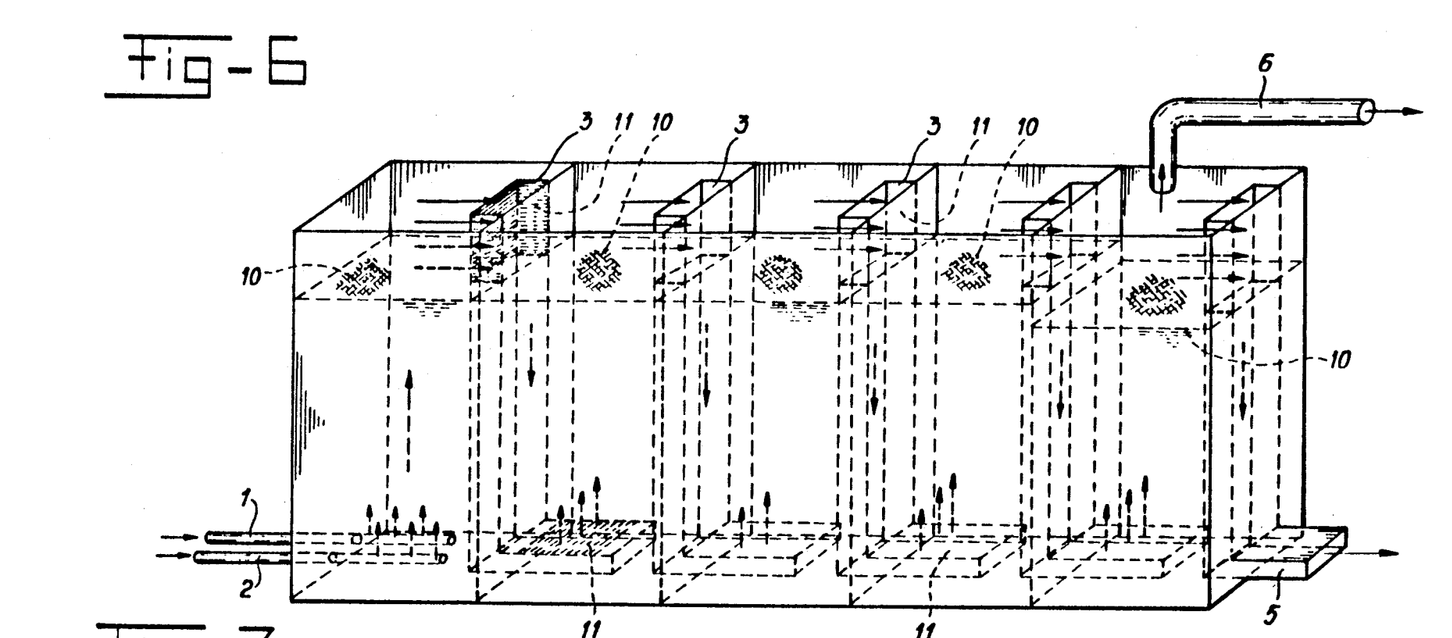

FIG. 6 shows another possibility in which air and water are jointly passed through a tube system to the subsequent compartment. In this case, a grid (10) for separating carrier material on the one hand and water/air on the other is also indicated. Shown at the bottom is a slotted grid (11) for water and air to flow through.

Figure 7:
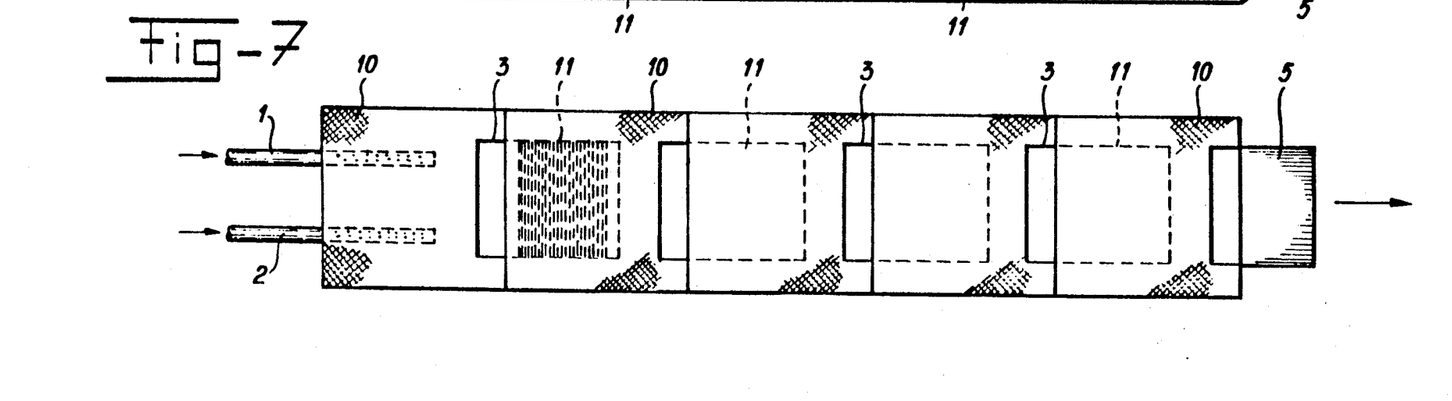

FIG. 7 is in this case a plan view of the apparatus shown in FIG. 6.

Figure 8:
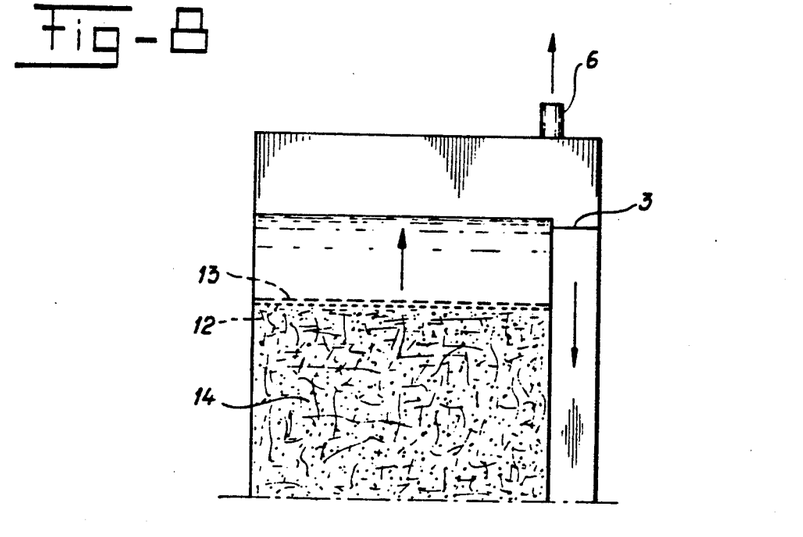

FIG. 8 shows an embodiment which is advantageous if loose carrier material is used. In this case, a grid (13), which, for example, comprises a coarse (reinforcing) grid with a fine grid underneath (for separating, on the one hand, carrier material and, on the other hand, water and air) is provided at the top of each compartment. FIG. 8 shows the fine grid (12) and the coarse grid (13). The carrier material with biomass is indicated by (14).

Figure 9:
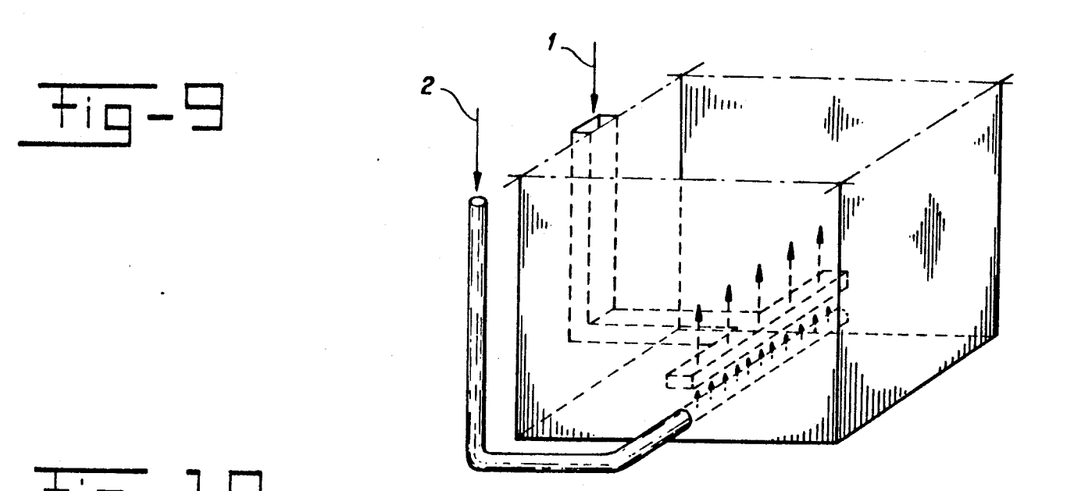

FIG. 9 shows an advantageous embodiment in which, for the case where air flow and water flow are separate, the air inlet (2) is provided beneath the water inlet (1) in order to obtain good liquid distribution in each compartment.

Figure 10:
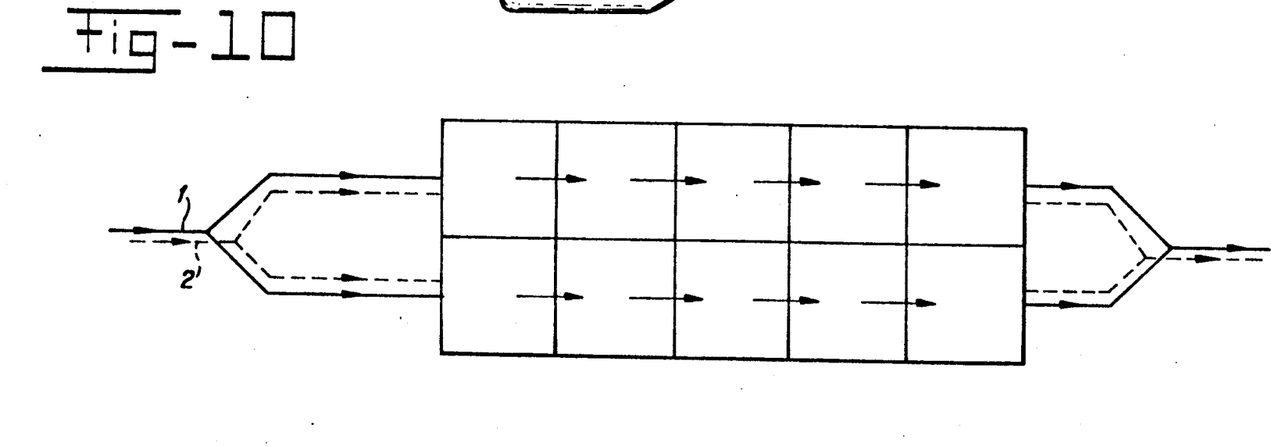

FIG. 10 shows a plan view in which two parallel purification lines are shown.

An apparatus of the type described in the preamble has now been found which is characterized in that it is so constructed that the water to be purified is consecutively subjected to a floating layer removal and also to a deferrization and the liquid obtained, optionally supplemented with air and/or other gases, is passed through an aerobic biological system which contains microorganisms which are able to utilise the contamination, present as organic compounds, as energy and/or a source of carbon.

In this method, an air/water volume ratio of not less than 0.5 and not more than 20, in particular of not less than 0.5 and not more than 10, is preferably used. These ratios lead in practice to good results.

Expediently, the aerobic biological system is preceded by a sand filter which is so constructed that the aeration of the (ground) water takes place above the sand column which is composed of moderately coarse sand (350–500 $\mu$m). For the aeration, it is possible to make use, inter alia, of a perforated plate aerator or aeration via packing bodies such as Raschig rings. In this process, the air flows in countercurrent with the downward-flowing water. Iron and manganese which are dissolved in the water are converted by atmospheric oxidation into iron and manganese compounds which are virtually insoluble in water. The air which leaves the sand filter is passed to the aeration element of, preferably, the first compartment of a combined air and water purification installation. After passing through the sand filter, the water is also passed to the combined air and water purification installation. Using two sand filters alternately makes it unnecessary to stop the purification while a sand filter is being backflushed.

Consideration can also be given to using and flushing two sand filters alternately.

It is also possible to use an upflow sand filter, this being especially expedient if the iron and/or manganese content of the ground water pumped up is very high. Here, again, the sand filter is composed of moderately coarse sand of 350–500 $\mu$m diameter. The aeration takes place in a separate aeration chamber upstream of the sand filter, the air used being passed into the first compartment of the purification installation. If use is made of said upflow sand filter, it will not be necessary to follow any backflushing procedure. If necessary, the sand can be replaced by clean sand after the passage of time.

Should the occasion arise, the (ground) water may be further pre-purified with the aid of an oil and/or a petrol trap.

If required, the effluent from the biological purification installation can be "polished" by means of filtration. This latter may, for example, be necessary in the case of (re-)infiltration of water for the purpose of in situ soil cleansing.

The amount of $O_2$ added can be adjusted on the basis of measurements of the $O_2$ content of the effluent from the apparatus.

Figure 11:
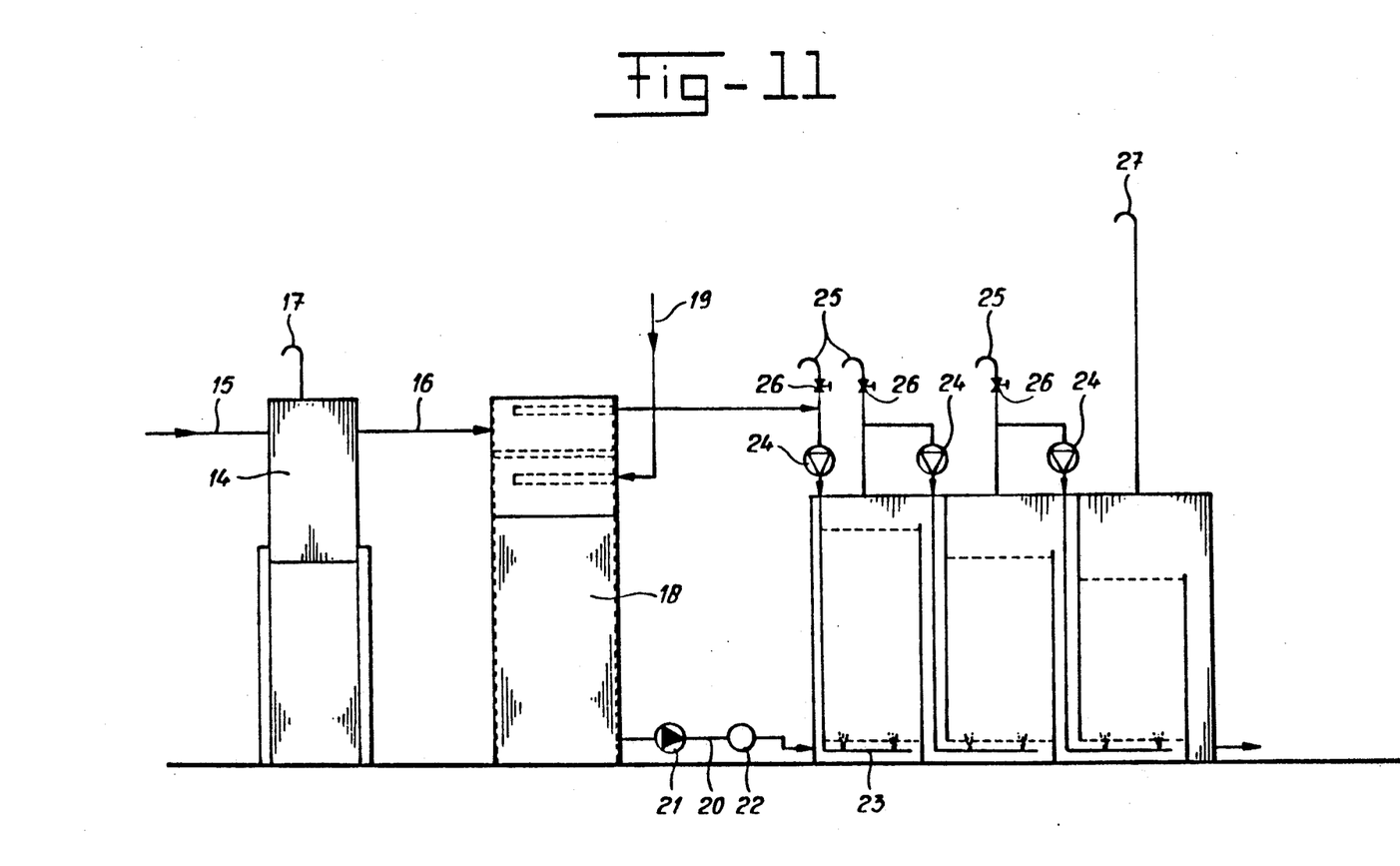

FIG. 11 is an example of a flow diagram for physical/chemical and biological (ground-)water purification according to the invention, in which (14) is a floating layer removal system, for example, an oil and petrol trap with inlet (15) and outlet (16). (17) is a vent and (18) is a sand filter with forced aeration of the incoming water (air inlet (19)). After passing through the sand filter, the water and the contaminated stripping air above the sand filter, possibly with contaminated air from another source, is passed via pipe (20), which is provided with pump (21) and shut-off valve (22), to the bottom of the combined air/water purification installation (23). Air is extracted with the aid of the air pumps (24) and introduced at the bottom of the compartments. The pumps are so adjusted that the air flow rate of each subsequent pump is greater than that of the preceding one. In this way, clean ambient air can additionally be passed into the compartments via inlet (25), which can be sealed off with shut-off valve (26). As polishing step for the biologically purified water, use can be made of a sand filter (28). The final compartment is provided with a vent (27).

Connecting several compartments in series creates a plug flow in the installation. This is important, in particular, for removing contamination from the air phase. In the first compartments, contaminants in the aqueous phase, in particular, will be decomposed, but as the concentration in the aqueous phase drops, mass transfer of the volatile contaminants from the air phase to the aqueous phase occurs, as a result of which the latter are also decomposed.

In the compartments, carrier material to which microorganisms can attach themselves is provided in the section with upward flow. As a result of this, the system is also capable of treating air and water flows (<1 mg/l) with relatively low concentrations. A suitable carrier material is, for example, small blocks and/or solid plates of porous polyurethane, optionally provided with a studded structure (for example, egg-box structure) or fine to coarse sand (100–1000 $\mu$m).

Figure 12:
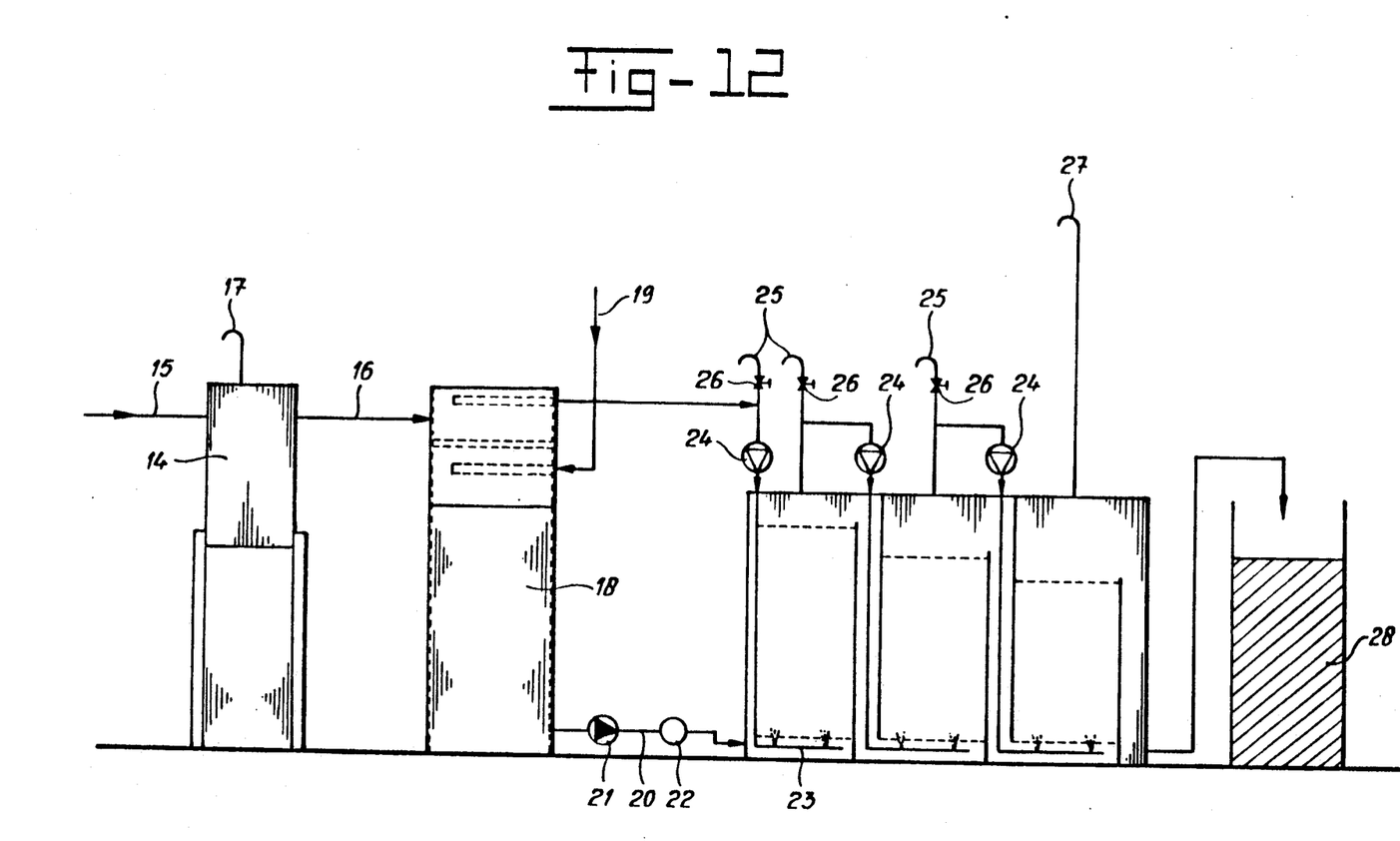

FIG. 12 shows an embodiment in which a sand filter (28) is additionally placed upstream of the so-called polishing at the end of an apparatus shown in FIG. 11.

Figure 13:
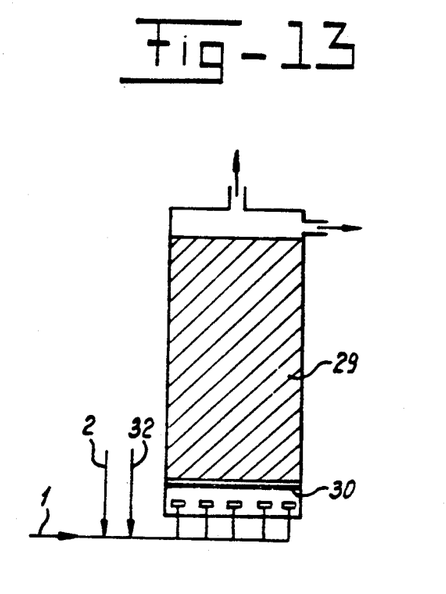
Figure 14:
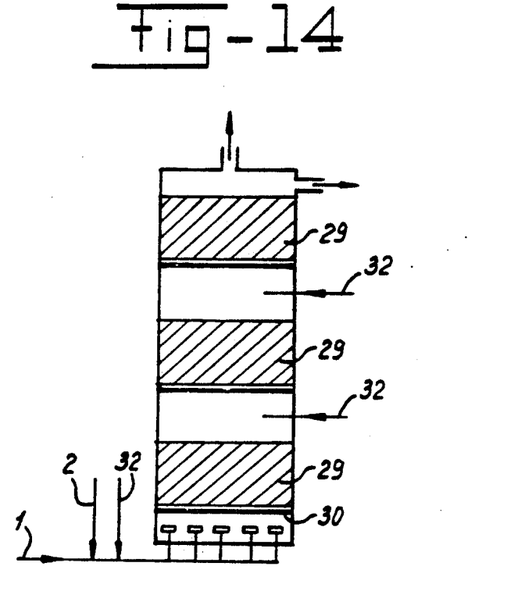

To obtain a plug flow in a system comprising 1 or more compartments placed above one another, an embodiment as described in FIGS. 13 and 14 is effective. This involves a reactor driven with upflow and having a height/diameter ratio of 2 to 8, for example 4 m in height and 1 m in diameter, filled with, for example, porous carrier material (29) which is placed on a supporting plate (30). The water inlet (1) and air inlet (2) are at the bottom. Water and air are jointly fed into the reactor via a distribution system. If desired, air and/or other gases (natural gas, methane) can additionally be fed in via (32). The system should be scaled up by connecting a few modules in parallel because the height/diameter ratio of 2–8 continues to be maintained.

Figure 15:
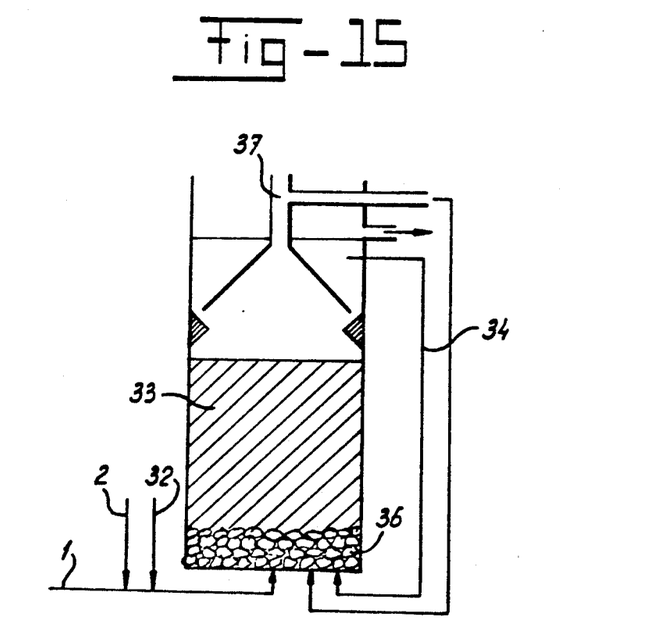

FIG. 15 shows sand as carrier material (33) in which, as a consequence of the upflow operation combined with a far-reaching recirculation of the water (34) and/or air (35), an expanded sand bed (expansion factor 1½–2½) is obtained. The reactor (15) is provided at the bottom with gravel and grinding material (36) in order to achieve a good distribution of the water and gas fed in. The reactor may be provided with a three-phase separator (37) at the top in order to minimise flushing-out of carrier material and microorganisms attached to it.

In order to achieve an optimum purification efficiency, it may be necessary to add nutrients, such as nitrogen, phosphate and/or trace elements, to the installation. To decompose certain compounds, such as volatile organochlorine compounds (trichloroethylene, perchloroethylene) it may be desirable to add other gases. These may then serve as a supplementary nutrient source for the microorganisms. The desired reactions can be stimulated by the choice of the gas or gases to be added. In the case of the abovementioned organochlorine compounds, the addition of methane or natural gas is desirable.

The oil and petrol trap shown in FIG. 11, which has a coalescence filter, has, for example, a capacity of not less than 10 l/s. The sand filter has a diameter of 1.40 m and a height of 2.25 m and is approximately ⅔ filled with sand (350–500 μm). Aeration of the incoming water takes place at the top. The air used for aerating the water is fed in at the bottom of the first compartment. After passing through the sand filter, the water is also fed in at this point. The volumes of the compartments filled with carrier material are consecutively 2.3, 2.1 and 2.0 m$^3$. The air flow increases for each compartment, not less than 30 m$^3$/hour being introduced in the final compartment. If necessary, the effluent of the biological purification installation can be "polished" by means of filtration. This latter may be necessary, for example, on (re-)infiltrating water for the purpose of in situ soil cleansing.

The reactor should preferably be compact in construction and be capable of being used at more than one place (it must therefore be transportable), and it must be flexible enough to be capable also of handling other flow rates and material loads.

According to an embodiment of the method according to the invention, the water flow and air flow can be split into two subflows which each pass through a purification line. Each purification line comprises, for example, five compartments in series. This achieves the result that the system is flexible (two lines) and a plug flow is produced (five compartments in series). The principle is shown in FIG. 10. The structure of the purification installation is then as follows: each purification line comprises five compartments which each have an area of 1×1 m$^2$ and a height of 2 m. Both the water flow (10–15 m$^3$/hour) and the air flow (via air extraction from the sand filter 10 m$^3$/hour and via aeration 150 m$^3$/hour) enter the first compartment at the bottom.

It is preferable that the compartments are so constructed that each compartment is accessible by means of a manhole at the top. Furthermore, each compartment is preferably provided with a facility for sludge removal. Each compartment is also preferably provided with a facility for removing or adding polyurethane sponges or other carrier material without the separating grid at the top of the compartment having to be removed. Instead of cube-shaped sponges, polyurethane mats having a studded structure may be used.

A possible embodiment of the method according to the invention is illustrated on the basis of the examples below.

EXAMPLE 1

Ground-water and air purification

For the purpose of in situ purification of ground and ground water contaminated with petrol, soil air and ground water are extracted simultaneously and fed into the combined air-water purification installation (5 compartments each measuring 2 m$^3$ approximately ⅔ filled with water; apparatus according to FIG. 5). For the purpose of ground-water reconditioning, 10 to 15 m$^3$ per hour is extracted with a concentration of petrol constituents of approximately 1 mg/l. An amount of air which varies from initially 2 to finally 60 m$^3$ per hour is drawn off from the soil. The amount of contamination in the air phase is initially approximately 100 g/m$^3$ and finally 1 g/m$^3$.

The biological system was found to work well with a hydrocarbon load of 300 g/h. The soil air flow rate is adjusted to this (initially 1.8 to 4.8 m$^3$/hour, later increasing to 60 m$^3$/hour). The maximum flow rate is limited by the maximum reduced pressure which can be applied in the soil on location.

In this case, assuming that the conversion of —CH$_2$—+1.5 O$_2$ yields CO$_2$+H$_2$O, it can be calculated that 3.5 g of O$_2$ is needed for 1 g of petrol. With a material load of 200 g/hour, 750 g O$_2$/hour is then required. Air contains approximately 250 g O$_2$ per m$^3$. The minimum aeration flow rate of the reactor is therefore 3.0 m$^3$/hour. In the practical installation, an air/water ratio of 4 to 10 has been maintained.

Measurements on the combined air-water purification installation after approximately 6 months from the start reveal the following results.

Ground-water flow rate; 17.0 m$^3$/h.
Ground-water concentration: approximately 500 mg/m$^3$.
Soil air flow rate; 28.8 m$^3$/h.
Soil air concentration: approximately 10 g/m$^3$.
Exhaust gas flow rate; 248 m$^3$/h.
Concentration in exhaust gas: <0.06 g/m$^3$.
Concentration in effluent: <0.15 g/m$^3$.

The above results in a material loading of the apparatus via

| water: | 17.0 × 0.5 = | 8.5 g/h |
| air: | 28.8 × 10.0 = | 288 g/h |
| | total | 296.5 g/h |

The loss from the purification system via the emission flows does not exceed

| water: | 17.0 × 0.15 = | 2.55 g/h |
| air: | 248 × 0.06 = | 14.9 g/h |
| | total | 17.5 g/h |

This signifies a purification efficiency of more than 94%.

Measurements on the combined air-water purification installation after approximately 11 months of operation yield the following data:

Ground-water flow rate: 15.0 m$^3$/h.
Ground-water concentration: approximately 500 mg/m$^3$.
Soil air flow rate: 63 m$^3$/h.
Soil air concentration: 2.8 g/m$^3$.
Exhaust gas flow rate: 270 m$^3$/h.
Exhaust gas concentration: <0.01 g/m$^3$.
Effluent concentration: <0.15 g/m$^3$.

The above results in a material loading of the biological enclosure via

| water: | 15.0 × 0.5 = | 7.5 g/h |
| air: | 63 × 2.8 = | 173 g/h |
| | total | 180.5 g/h |

The losses from the purification system via the emission flows do not exceed

| water: | 15.0 × 0.15 = | 2.3 g/h |
| air: | 270 × 0.01 = | 2.7 g/h |
| | total | 5.0 g/h |

This signifies a purification yield of more than 97%.

Analysis results for the soil air (LOF) and the exhaust gas as measured by the independent VEG-Gasinstituut in Apeldoorn are reproduced below.

Analysis of air sample for main components

Method

The analysis has been carried out on the basis of ISO 6974-1984: "Natural gas Determination of hydrogen, inert gases and hydrocarbons up to C8 - Gas chromatographic method".

The calculations have been carried out in conformity with ISO 6976; "Natural gas - Calculation of calorific value, density and relative density".

Description of sample

| | |
|---|---|
| Name of samples: | Soil air Code No. 6145A M 12106 |
| | Exhaust gas Code No. 6166A M 12107 |
| Sampling method: | Evacuated aluminium cylinder |
| Samples collected by: | Tauw Infra Consult bv |

ANALYSIS REPORT

Analytical result

Sample number M 12106
Gas sample coding: Soil air No. 6145A
The analysis yielded the following results:

| Component | content in mol ppm |
|---|---|
| benzene | 49 |
| toluene | 254 |
| C-5 alkanes | 51 |
| C-6 alkanes | 128 |
| C-7 alkanes | 102 |
| C-8 alkanes | 46 |
| C-9 alkanes | 56 |
| C-6 cycloalkanes | 18 |

The relative accuracy of the determination is 10%.
Detection limit of the analytical method: 0.1 mol ppm

Analytical result

Sample No.: M 12107
Gas sample coding: Exhaust gas No. 6166A
No higher hydrocarbons have been detected in the gas sample.

EXAMPLE 2

Ground-water purification

The purification of ground water contaminated with petrol and oil is carried out with a ground-water drainage of 15 m$^3$/hour. The concentration of contaminating constituents is initially 3 and later 1 g/m$^3$.

The ground water is passed into the purification system (3 compartments each measuring 2 m$^3$ approximately ⅔ filled with water: apparatus according to FIG. 11).

The total loading of the system is initially 75 and later 15 g/hour so that 55 to 265 g of O$_2$ per hour is needed. The required aeration flow rate of the reactor is not less than 0.25 to 1.1 m$^3$/hour. In practice, an aeration flow rate of approximately 30 m$^3$/hour is used, as a result of which the air/water ratio is 2.

Measurements on the purification system yield the following result:
Ground-water flow rate: 12-15 m$^3$/h.
Aeration flow rate: 30 m$^3$/h.

| hydrocarbon infl. | concentration, mg/l purification effl. efficiency (%) |
|---|---|
| date | 149903299 |
| date | 233803399 |

The concentration of aromatics in the exhaust gas is <0.6 mg/l. This signifies that the removal of the hydrocarbons from the ground water is completely the result of biodegradation.

More comprehensive analytical results on the ground water are given in the following table.

TABLE 1

| Analytical results on ground-water samples: Water flow rate: 12-15 m$^3$/hour Contents expressed in micrograms/liter | | | | | | | | | |
|---|---|---|---|---|---|---|---|---|---|
| | A | B | C | 13/11 date 1 infl. | 13/11 date 1 effl. | +2 days 15/11 date 2 effl. | +3 days 16/11 date 3 effl. | +4 days 17/11 date 4 effl. | +7 days 20/11 date 5 infl. | +7 days 20/11 date 6 effl. |
| mineral oil (%) | 50 | 200 | 600 | 890 | 10 | 100 | 20 | 10 | 580 | 20 |
| total volatile aromatics (GC) | | 30 | 100 | 4100 | 22 | 1 | 1 | <1 | 2800 | 13 |
| benzene | 0.2 | 1 | 5 | 1700 | 13 | 1 | 1 | <1 | 1500 | 13 |
| toluene | 0.2 | 15 | 50 | 22 | <1 | <1 | <1 | <1 | 63 | <1 |
| ethylbenzene | 0.2 | 20 | 60 | 380 | 2 | <1 | <1 | <1 | 99 | <1 |
| p- and m-xylene | 0.2 | 20 | 60 | 1900 | 7 | <1 | <1 | <1 | 1100 | <1 |
| o-xylene | 0.2 | 20 | 60 | 54 | <1 | <1 | <1 | <1 | 45 | <1 |
| 1,3,5-trimethylbenzene | | 15 | 50 | 62 | <1 | <1 | <1 | <1 | 41 | <1 |
| 1,2,4-trimethylbenzene | | 15 | 50 | 200 | <1 | <1 | <1 | <1 | 130 | <1 |
| cyclic aromatic hydrocarbons | | | | | | | | | | |
| naphthalene | 0.2 | 7 | 30 | 17 | <1 | <1 | <1 | <1 | 14 | <1 |

C—N alkane: some of the content of alkanes contained in N carbon atoms

C—N cycloalkanes: some of the contents of cycloalkanes contained in N carbon atoms, only the following constituents being involved: m-c-pentane, c-hexane, e-c-hexane, di-m-c-hexane, e-c-hexane and a tri-m-c-hexane (c:cyclo, m:methyl and e:ethyl).

EXAMPLE 3

Ground-water purification

The purification of ground water contaminated with aromatics and PAHs is tested on a small scale with a flow rate of 100-200 l/hour. The ground water contains approximately 1000 mg/l PAHs (16 EPA), approximately 500 mg/l aromatics and 10 mg/l oil constituents. The total loading of the system (1 compartment of 47 1¾ filled with polyurethane, apparatus according to FIG. 11) was therefore approximately 1-2 g/hour.

With this loading, the $O_2$ demand is not less than 3.5 to 7.0 g/hour, or 14 to 28 l of air per hour.

However, the air/water ratio was 3 to 4.

Measurements on the system yield the following results

Ground-water flow rate: 164 l/hour
Infl. concentration of PAHs: 1300 mg/l
aromatics: 296 mg/l
oil: 7.0 mg/l
aeration flow rate: 553 l/hour
Effl. concentration of PAHs: 10 mg/l
aromatics: <2.8 mg/l
oil: <0.3 mg/l
Exhaust gas concentration of aromatics: <1.5 mg/l
oil: <0.05 mg/l The purification efficiency is therefore more than 96%; <0.6% is removed by decomposition.

EXAMPLE 4

Downstream insertion of a backflushable sand filter operated in downflow for "polishing" the effluent of the biologically purified water (analogously FIG. 12) can achieve an additional removal of contaminants.

In addition to removing undissolved constituents (for example, iron oxide and sludge flocs) dissolved contaminants are also further decomposed biologically.

The table below shows analytical results of biologically pre-purified ground water before and after sand filtration.

|  | influent (mg/l) | effluent. (mg/l) | date 1 influent (mg/l) | date 2 effluent (mg/l) | (1 month later) |
| --- | --- | --- | --- | --- | --- |
| Benzene |  | 310 | 5.9 | 200 | 0.3 |
| Toluene | 4.3 | <0.5 | <5 | <0.5 |  |
| Ethylbenzene |  | 110 | <0.5 | 65 | <0.5 |
| o-Xylene |  | 20 | 1.1 | 13 | <0.5 |
| m-p-Xylene |  | 18 | 0.8 | 10 | <0.5 |
| Naphthalene |  | 99 | 0.8 | 58 | <0.2 |

The combined water and air purification according to the invention can be used, inter alia, in removing contaminants from petrol stations and in chemical industries. By extracting ground water and soil air, it is possible to extract volatile and nonvolatile components from the soil so that excavation techniques can be avoided. The extracted soil air and the extracted ground water should, however, be purified before discharge. The system according to the invention offers a good possibility of purifying the air and the water simultaneously.

Sites of former gas works can (partially) be purified with the system. In particular, naphthalene and phenols and in part aromatic hydrocarbons can be removed from the soil by ground-water extraction, while volatile aromatics (benzene, ethylbenzene and xylene) can be removed by extracting soil air. The water flow and air flow can then be simultaneously purified biologically by the method according to the invention.

The method according to the invention furthermore avoids the production of new waste flows, such as saturated carbon which is obtained in active carbon filtration. In addition, the combination of biological air and water purification offers the possibility of treating volatile and less volatile constituents in one system.

The method according to the invention may furthermore be of great benefit for the chemical industry in which much work is being done on potentially biologically degradable solvents, it also being possible to think of protective measures in addition to soil reconditioning activities. By sucking off air and extracting water, the use of an apparatus according to the invention is also capable of rendering contaminants harmless before they can contaminate the subsoil and the deeper ground water. The invention is extremely suitable when in situ soil cleansing methods are used.

I claim:

1. Apparatus for the simultaneous purification of air and water, comprising a plurality of compartments, said compartments being arranged in a series extending from a first to a last of said plurality of compartments, each compartment being partially filled with a biologically active material, said first compartment having inlet means into a lower portion thereof for impure air and water, each said compartment other than said last compartment having outlet means adjacent an upper portion thereof communicating with conduit means for conveying air to a lower portion of the next said compartment in said series and outlet means for conveying water to said next compartment, each said compartment other than said last compartment having an enclosed upper portion constructed and arranged such that air can leave only through said conduit means and pass to a lower portion of said next compartment, said last compartment having outlet means adjacent an upper portion thereof for purified air and water.

2. Apparatus as claimed in claim 1, said outlet means for water being disposed at progressively lower levels in each said compartment of said series in a direction from said first to said last compartment, thereby to establish in each said compartment a water level which is lower from compartment to compartment from said first to said last compartment, said outlet means for said purified water being lower than any other said outlet means for water.

3. Apparatus as claimed in claim 1, in which said outlet means for conveying water communicates with conduit means for conveying water from adjacent an upper portion of one compartment to a lower portion of the next said compartment in a direction from said first toward said last compartment.

4. Apparatus as claimed in claim 1, wherein said outlet means for conveying air serves also as said outlet means for conveying water.

5. Method for the simultaneous purification of air and water in a plurality of compartments arranged in a series extending from a first to a last of said plurality of compartments, each compartment being partially filled with a biologically active material, comprising introducing impure air and water into a lower portion of said first compartment, removing air and water from an upper portion of each said compartment other than said last compartment, conveying the removed air to a lower portion of the next said compartment in said series, maintaining each said compartment other than said last compartment enclosed in its upper portion such that air can leave only by passing into a lower portion of the next said compartment, conveying said water from compartment to compartment, and removing from an upper portion of said last compartment purified air and water.

6. Method as claimed in claim 5, and establishing in each said compartment a water level which is lower from compartment to compartment from said first to said last compartment.

7. Method as claimed in claim 5, and conveying said water from adjacent an upper portion of one compartment to a lower portion of the next said compartment in a direction from said first toward said last compartment.

* * * * *